United States Patent [19]

Tsuruta et al.

[11] Patent Number: 4,976,601
[45] Date of Patent: Dec. 11, 1990

[54] DIE EXCHANGER OF MOLDING APPARATUS

[75] Inventors: Kozo Tsuruta; Yuichi Yamada, both of Aichi, Japan

[73] Assignee: Aisin Takaoka Co., Ltd., Toyota, Japan

[21] Appl. No.: 459,459

[22] Filed: Jan. 2, 1990

[30] Foreign Application Priority Data

Apr. 27, 1989 [JP] Japan ................ 1-105965

[51] Int. Cl.⁵ .............. B29C 39/04; B29C 45/04
[52] U.S. Cl. .................... 425/182; 100/9.18; 164/323; 425/195
[58] Field of Search ............ 425/193, 190, 184, 195, 425/182; 164/323; 100/918

[56] References Cited

U.S. PATENT DOCUMENTS

| | | | |
|---|---|---|---|
| 4,150,305 | 4/1979 | Müller | 164/323 |
| 4,438,801 | 3/1984 | Bühler | 164/323 |
| 4,518,338 | 5/1985 | Hehl | 425/190 |
| 4,552,522 | 11/1985 | Van Melle | 425/182 |
| 4,737,095 | 4/1988 | Hehl | 425/190 |

FOREIGN PATENT DOCUMENTS 57-014252  3/1982  Japan .
62-137142  6/1987  Japan .
64-4863    1/1989  Japan .

*Primary Examiner*—Willard Hoag
*Attorney, Agent, or Firm*—Burns, Doane, Swecker & Mathis

[57] ABSTRACT

A die exchanger of a molding apparatus includes a die plate, a die carrying-in apparatus and a die carrying-out apparatus. The die carrying-in apparatus has at least one guide groove engaging a pin of the die and guiding a plurality of corresponding dies and has a first support plate movable forward and backward to the die plate so that the guide groove is connectable to a groove in clamp means provided on the die plate. The die carrying-out apparatus has a second support plate movable forward and backward to the die plate so that the second support plate can receive the die engaging the clamp, the second support plate movably supporting the die. The die carrying-in apparatus has a one-way feed mechanism feeding each of the corresponding dies which is supported by means of the guide groove of the first support plate to the die plate. The die carrying-out apparatus is tiltable for discharging the die.

16 Claims, 5 Drawing Sheets

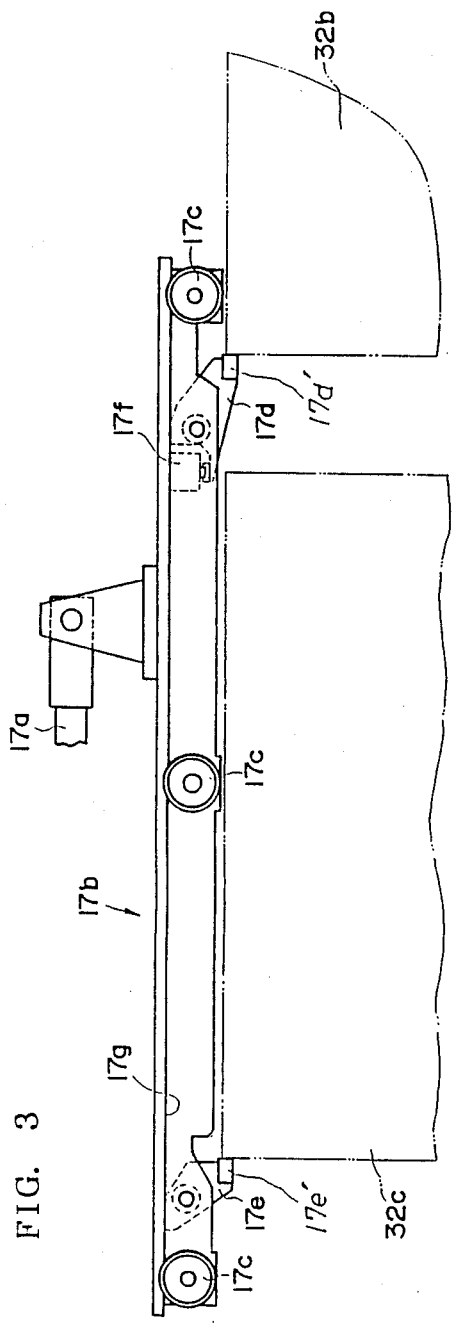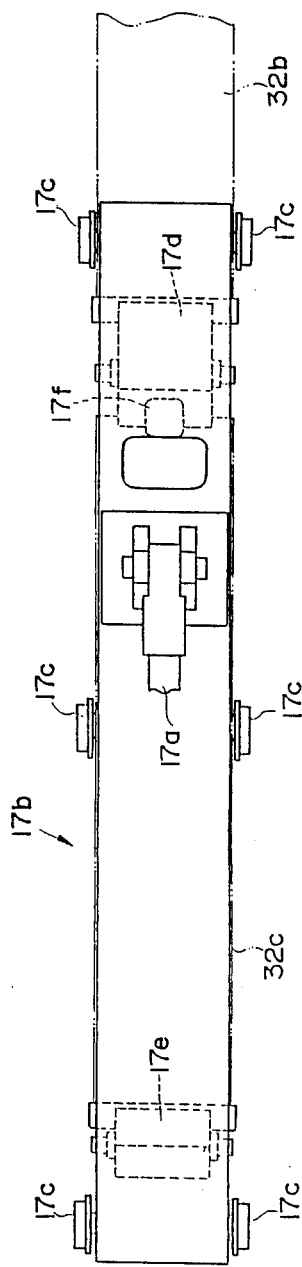

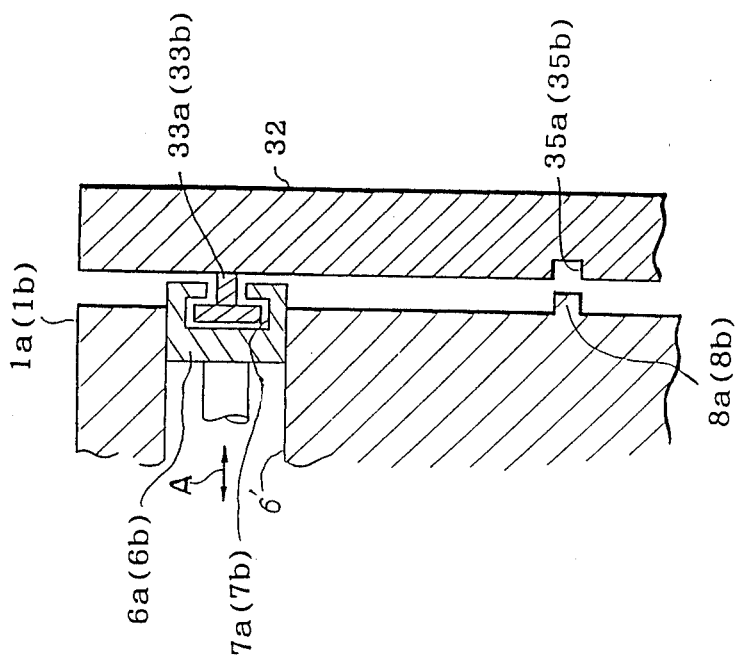
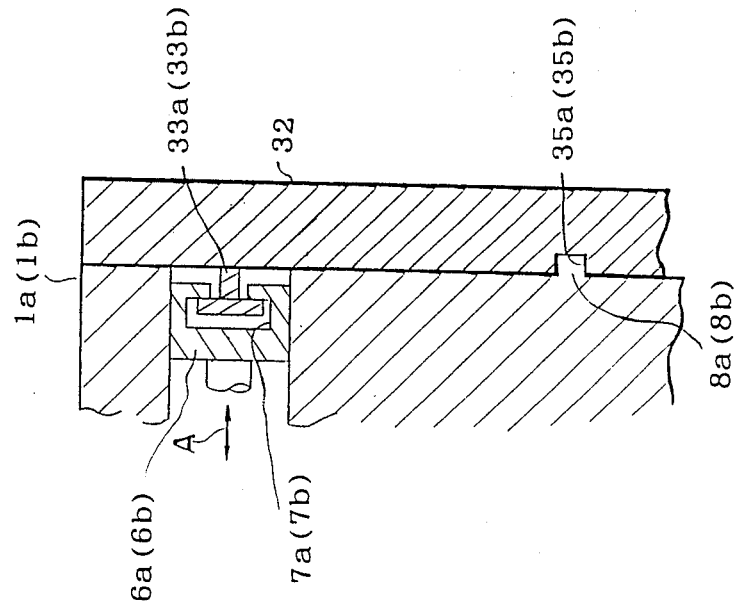

DIE EXCHANGER OF MOLDING APPARATUS

FIELD OF THE INVENTION

The present invention relates to a die exchanger used in a molding apparatus such as a molding machine for frameless or boxless molds, particularly sand molds with or without binder.

BACKGROUND OF THE INVENTION

JP Patent Kokoku-publication No. 57-14252 discloses such a prior-art apparatus. According to this apparatus, a replacement die is placed on a carriage, the carriage carries the replacement die so that the replacement die is connectable to a clamp claw and flanged rollers mounted on a die plate, and a cylinder means moves the die placed on the carriage to the die plate to engage the die with the clamp claw and the flanged rollers, whereby the die is replaced on the die plate (or pattern plate).

A bottom surface of the die includes a hole into which a piston rod of a working cylinder attached to the carriage and serving to fix the die to the top of the carriage in movement is inserted. Die-plate-side top and bottom surfaces of the die include guide grooves with which the clamp claw and the flanged rollers engage, each groove extending along a travel direction of the die across the top and bottom surfaces of the die.

This prior-art apparatus requires a complicated arrangement including the carriage, the working cylinder and the flanged rollers both attached to the carriage, and a conveyer frame facilitating the carriage to move forward and backward and entails problems in manufacture and manufacturing cost. The die used with the prior-art apparatus requires a severe working accuracy and strength (increasing in wall thickness) because the insertion hole and the guide grooves are defined in the die. Therefore, the number of manufacturing steps increases and then a disadvantage is entailed in cost when a number of corresponding dies are used.

In order to eliminate the problems in such prior-art, a die exchanger of an frameless mold molding apparatus has been developed and disclosed (JP Patent Kokai-publication No. 62-137142).

The apparatus of this publication has achieved a simplification in arrangement and improved the workability and rigidness of the die. However, this apparatus yet requires some improvements.

Namely, the apparatus disclosed in JP Patent Kokai-publication No. 62-137142 is such that the working cylinder 17 of the die carrying-in apparatus 2 can feed only one die at a time, and the die carrying-out apparatus 3 is arranged so that the second support plate 27a, 27b is rotated in order to allow the die to be taken out of the die plate side of the second support plate. Therefore, the arrangement of apparatus is complex, and burdensomes and the number of operation steps is not reduced, yet.

SUMMARY OF THE DISCLOSURE

An object of the present invention is to provide a novel die exchanger improved from the die exchanger of the frameless mold molding apparatus such as disclosed in JP Patent Kokai-publication No. 62-137142.

According to a first aspect of the present invention, there is provided a die exchanger of a molding apparatus comprising:

a die plate having clamp means which has a groove, guides a die by pin means provided on the die and fastens the die at a predetermined position;

a die carrying-in apparatus arranged on one side of said die plate; and a die carrying-out apparatus arranged on the other side of said die plate and opposite to said die carrying-in apparatus;

said die carrying-in apparatus having at least one guide groove which engages the pin means of the die and guides a plurality of corresponding dies, said die carrying-in apparatus having a first support plate movable forward and backward to said die plate so that the guide groove is connectable to the groove in the clamp means, said die carrying-out apparatus having a second support plate movable forward and backward to said die plate so that the second support plate can receive the die engaging the clamp, the second support plate movably supporting the die, said die carrying-in apparatus having one-way feed means for feeding each of the corresponding dies which is supported by means of the guide groove on the first support plate to said die plate.

According to a second aspect of the present invention, there is provided a die exchanger of a molding apparatus comprising:

a pair of die plates slidably disposed on a guide way, the die plates being positionable facing each other with facing surfaces extending transversely to the guideway, a die carrying-in apparatus arranged on one side of said guide way, and a die carrying-out apparatus arranged on the other side of the guide way at a position opposing the die carrying-in apparatus, each of said die plates having clamp means on the facing surface for guiding and clamping at a predetermined position a die fed from the die carrying-in apparatus, said carrying-in apparatus having a first support plate slidably disposed in a direction transverse to said guide way and guiding a die toward the die plates; and having one-way feed means for feeding a die to the die plate along a longitudinal surface of the first support plate, said one-way feed means having a base portion slidably disposed relative to the first support plate along the sliding direction of the first support plate and at least one arm pivotably installed on the base portion and engageable with a die supported on the first support plate only in one way movement toward the guide way, said carrying-out apparatus having a second support plate slidably disposed transverse to said guide way for receiving a die from the die plate and guiding away from the die plate, and tilting means for tilting down the remote end of the second support plate so as to slidably discharge a die.

A die plate side end of the guide groove in said die carrying-in apparatus preferably includes a recess engaging one end of the clamp means with the groove of the die plate to provide a continuous groove.

The first support plate of said die carrying-in apparatus preferably includes a pair of oppositely disposed support plates each of which includes the guide groove guiding separate dies.

Said die carrying-out apparatus may have tilting means for slidably descending and discharging the die, and one end opposite to a die plate side of the second support plate may have a die takeout gate.

One-way feed means of said die carrying-in apparatus may be movable forward and backward to the first support plate along the longitudinal axis of the guide groove in the first support plate and have one-way engagement means engageable with the die only in the travel direction of the die.

The pin means of the die serves as a means for engaging the clamp means. This pin means also serves as a means for guiding the die in association with a groove with which the pin means engages.

The clamp means includes a horizontally extending groove engaging and guiding the pin of the die, thereby horizontally guiding the die.

The first support plate of the die carrying-in apparatus horizontally guiding the plurality of dies includes the guide groove with which the pin engages.

For instance, a suitable means may urge the first support plate to approach the die plate so that the above guide groove is connectable to the groove in the clamp.

The feed means can concurrently transfer each of the plurality of dies supported on the first support plate to corresponding predetermined positions. That is, the feed means can concurrently transfer a second die which is situated nearest to the die plate to the die plate, and a third die which is situated secondly nearest to the die plate to the position previously occupied by the second die. Concurrently, the second die, when transferred, is brought into contact with a first die engaging the clamp of the die plate and pushes the first die to the second support plate.

Thus, the dies within the first support plate are guided by the guide groove and the engagement groove in the clamp and fed to the die plate by the feed means, so that a fresh die replaces the old die on the die plate.

The replaced die is discharged to a corresponding second support plate of the die carrying-out apparatus and taken out of the gate provided at the one end of the second support plate.

According to the present invention, the support plate and the guide groove in the support plate serve to transfer the die to the die plate instead of the prior-art arrangement of transferring a die by means of a carriage, so that the arrangement of the apparatus is simplified.

Further, according to the present invention, the die has pin means instead of the prior-art arrangement comprised of a fastening insertion hole, an engagement guide-groove etc. in the die so that the workability and rigidness of the die are improved.

The die exchanger of the present invention has been more improved in the following points than the apparatus disclosed in JP Patent Kokai-publication No. 62-137142:

(1) According to this apparatus, the second support plate is rotated in order to allow the die to be taken out of the die plate side of the second support plate. On the other hand, the die exchanger of the present invention has the die takeout gate at the end opposite to the die plate side of the second support plate, so that the die carrying-out apparatus can eliminate a rotation mechanism. Consequently, the arrangement of the die exchanger of the present invention is simplified and the number of operating steps is reduced, so that productivity is improved.

(2) The feed means of the die carrying-in apparatus can concurrently and separately feed a plurality of dies although the apparatus of the above JP Patent Kokai-publication No. 62-137142 can feed only one die at a time, so that burdensomeness and the number of operating steps are reduced to improve productivity.

BRIEF DESCRIPTION OF THE DRAWINGS

FIG. 3 is a front view of a feed means;

FIG. 4 is a plan view of the feed means of FIG. 3;

FIG. 5(a) illustrates a condition of a movement of the die in a cross-section taken along the line V—V in FIG. 1;

FIG. 5(b) illustrates a condition of clamping of the die in the same cross-section as in FIG. 5(a)

DETAILED DESCRIPTION OF THE PREFERRED EMBODIMENTS

The preferred embodiments of the present invention will be described hereinafter with reference to the drawings.

Figure 1:
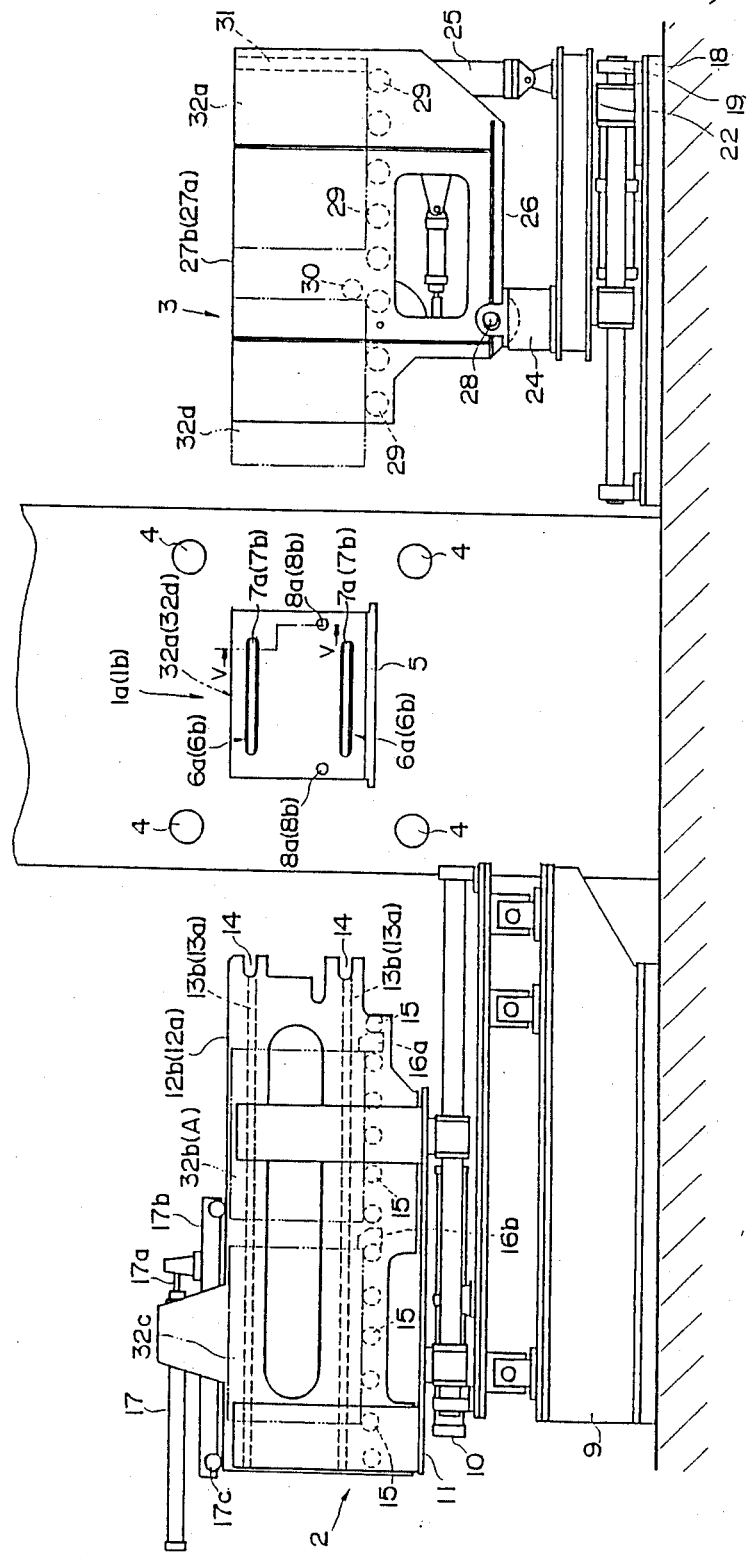
FIG. 1 is a front view of a die exchanger according to one embodiment of the present invention.
Figure 2:
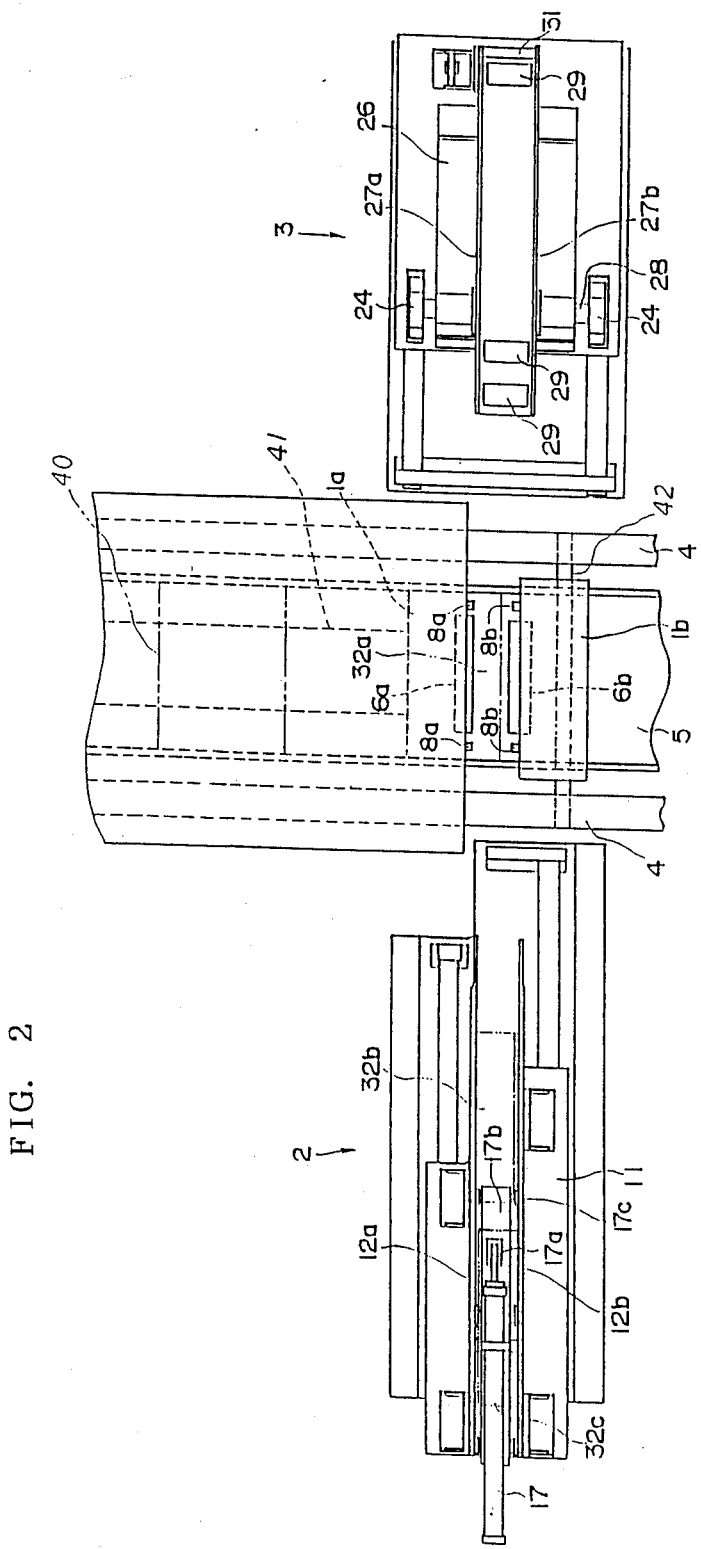
FIG. 2 is a plan view of the die exchanger of FIG. 1.

FIG. 1 is a front view of a die exchanger of the present embodiment. FIG. 2 is a plan view of the die exchanger of FIG. 1.

A die carrying-in apparatus 2 and a die carrying-out apparatus 3 are disposed respectively opposing to opposite sides of a pair of die plates 1a and 1b to each of which a die is mountable. A guideway 5 extends between and along four push-pull rods 4. A pair of die plates 1a and 1b are placed opposing each other on the guideway 5. The die plate 1a is connected to a cylinder means 41 capable of extending and contracting. The die plate 1b is connected by means of a rotatable framework 42 to the push-pull rods 4 capable of extending and contracting. The cylinder means 41 and the push-pull rods 4 can respectively move the die plates 1a and 1b forward and backward along the guideway 5. When the cylinder means 41 and the push-pull rods 4 contract, the die plates 1a and 1b are moved backward (retracted) to a molding-chamber defining position (an upper place in FIG. 2) and define a molding chamber 40 on the guideway 5.

A front surface of each of the die plates 1a and 1b has a clamping mechanism, i.e., a pair of clampers 6a and 6b movable forward and backward along the guideway 5 by an actuator (not shown e.g., hydraulicly operated piston or the like), respectively. Each of the clampers 6a and 6b includes engagement grooves 7a or 7b for guiding and fastening a die.

Horizontally opposite edge-areas of the front surface of each of the die plates 1a and 1b have a suitable number of positioning pins 8a and 8b which position the die.

In the die carrying-in apparatus 2 arranged opposite to the one side of each of the die plates 1a and 1b, a first drive cylinder 10 capable of extending and contracting is mounted on a first base framework 9, a first framework 11 is fixed to the first drive cylinder 10, a pair of first vertical support plates 12a and 12b are provided standing on the first framework 11 opposite to each other, each of the first vertical support plates 12a and 12b defines two guide grooves 13a or 13b guiding the die, an end of each of the first vertical support plates 12a and 12b on the side of the die plates 1a and 1b defines two recesses 14, each of the guide grooves 13a and 13b communicates with a corresponding recess 14, and each of the recesses 14 engages with one end of a corresponding clamper 6a or 6b so that the respective guide grooves 13a and 13b are connected to the die engagement grooves 7a and 7b. Lower portions of the first vertical support plates 12a and 12b have a proper number of die carrying rollers 15 and die fixing stoppers 16a and 16b. On the other hand, upper portions of the first vertical support plates 12a and 12b have a feed means, i.e., a working cylinder 17 which moves a plurality of dies (two according to the present embodiment) to respective predetermined positions on the die plates 1a and 1b and the first vertical support plates 12a and 12b.

The front end of a piston rod 17a of the working cylinder 17 has a die feed means 17b as shown in FIGS. 3 and 4. The die feed means 17b has a plurality of rollers 17c travelling on the top surfaces of the first vertical support plates 12a and 12b and has first and second rotatable arms 17d and 17e each of which engages and pushes a top corner of a corresponding die.

A clockwise rotation of each of the arms 17d and 17e is blocked by a contact of the arm 17d or 17e with a stopper 17f or the underside 17g of the feed means 17b and on the other hand, a counter-clockwise rotation of each of the arms 17d and 17e from the blocked position is allowed. The underside of each of the arms 17a and 17e is designed to be in contact with and slide along the top of the die (The underside of the embodiment illustrated in FIG. 3 is flat, however, may be curved). The contact of each of the arms 17d and 17e lifts up the front end thereof (i.e., each of the arms 17d and 17e rotates clockwise). Therefore, the forward and backward movements (reciprocation) of the die feed means 17b allow a one-way (toward the right of FIG. 3 according to the present embodiment) feed of a corresponding die by means of an engagement of each of contact elements 17d' and 17e' provided at the fronts of the respective arms 17d and 17e with the left-hand top end of the die shown in FIG. 3.

In the die carrying-out apparatus 3 arranged opposite to the other side of each of the die plates 1a and 1b, a second drive cylinder 19 capable of extending and contracting is mounted on a second base framework 18, and a second framework 22 is fixed to the second drive cylinder 19. One side of the second framework 22 has a pair of support frameworks 24 and 24, the other side of the second framework 22 has an tilting cylinder 25, an tiltable framework 26 is provided above the second framework 22, a pair of second vertical support plates 27a and 27b are disposed standing on the tiltable framework 26 opposing each other. One side of each of the second vertical support plates 27a and 27b is pivotably mounted on a shaft 28 and on the other hand, the other side of each of the second vertical support plates 27a and 27b is connected to the tilting cylinder 25 so that the second vertical support plates 27a and 27b are tiltably supported, the centers in height of the second vertical support plates 27a and 27b have a plurality of die carrying rollers 29 and a die fixing stopper 30, and ends opposite to the die plate sides of the second vertical support plates 27a and 27b have a vertically movable gate 31 (serving as a stopper).

A rear surface of the die 32 has flange pins 33a and 33b with a circular cross section as shown in FIG. 5. Two corresponding pins 33a and 33b are located at positions corresponding to the guide grooves 13a and 13b in the first vertical support plates 12a and 12b and die engagement grooves 7a and 7b in the clampers 6a and 6b.

A lower portion of the rear surface of the die 32 includes positioning recesses 35a and 35b at positions corresponding to the positioning pins 8a and 8b of each die plate 1a and 1b.

The clampers 6a and 6b include the engagement grooves 7a and 7b with which the pins 33a and 33b engage. The clampers 6a and 6b are movable along guide grooves 6' in the directions of a double arrow A.

Figure 6:
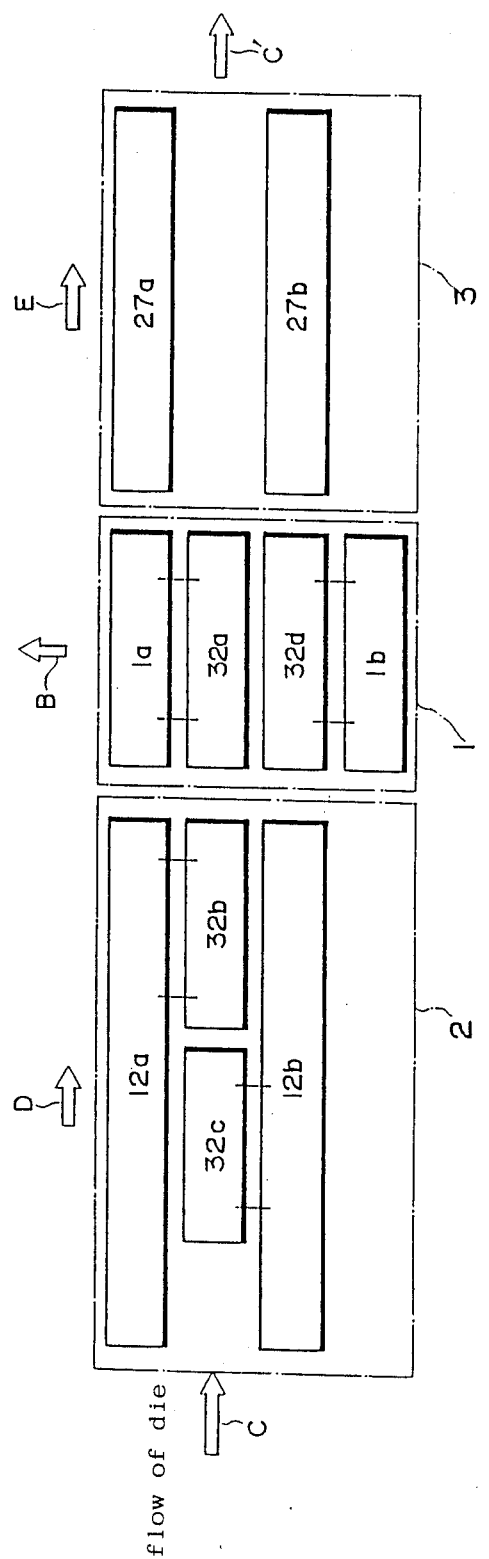
FIG. 6 is a diagram illustrating arrangements of dies.

An operation of exchanging the die which is supported in a vertical position by corresponding first vertical support plate and die plate in the same side as shown in FIG. 6 will be described hereinafter.

FIG. 6 illustrates arrangements of the dies, each pair of parallel lines illustrating an engagement relationship between the first vertical support plate, die plate and die. As shown in FIG. 6, the first die 32a is mounted to the die plate 1a, the second die 32b is mounted to the first vertical support plate 12a, the third die 32c is mounted to the first vertical support plate 12b, and the fourth die 32d is mounted to the die plate 1b. The first die 32a is secured by the clampers 6a and 6a to the die plate 1a so that the pins 33a and 33a and the positioning recesses 35a and 35a respectively engage the engagement grooves 7a and 7a in the clampers 6a and the positioning pins 8a and 8a in the die plate 1a. The second die 32b engages the first vertical support plate 12a by means of the stopper 16a so that the pins 33a and 33b provided on the rear surface of the second die 32b engage the guide grooves 13a and 13a in the first vertical support plate 12a. The third die 32c engages the first vertical support plate 12b by means of the stopper 16b so that the pins 33b and 33b provided on the rear surface of the third die 32c engage the guide grooves 13b and 13b. The fourth die 32d is secured by the clampers 6b and 6b to the die plate 1b so that the pins 33b and 33b and the positioning recesses 35b and 35b respectively engage the engagement grooves 7b and 7b in the clampers 6b and 6b and the positioning pins 8b and 8b in the die plate 1b.

After the clampers 6a and 6a of the die plate 1a is extended (toward the first die 32a) and the pins 33a and 33a of the first die 32a are disengaged from the walls of the engagement grooves 7a and 7a in the clampers 6a and 6a (See FIG. 5(a)), the first drive cylinder 10 is extended to move the first framework 11 (toward the right in FIG. 1) thereby engaging the recesses 14 and 14 in the first vertical support plates 12a and 12b with the clampers 6a and 6b of the die plates 1a and 1b, and the second drive cylinder 19 is extended to move the second framework 22 toward the die plates 1a and 1b (toward the left in FIG. 1) and holds the second vertical support plates 27a and 27b at the predetermined position. After the engagements of the second and third dies 32b and 32c with the stoppers 16a and 16b have been released, the working cylinder 17 is extended to push the first and second dies 32a and 32b by means of the first arm 17d, thereby moving the first die 32a along the second vertical support plate 27a (in the direction E in FIG. 6) until the first die 32a is brought into contact with the stopper 30 provided intermediate of the second vertical support plate 27a, and thereby moving the second die 32b to a predetermined position (in the direction D in FIG. 6) in the die plate 1a and holding the second die 32b at the same position so that the pins 33a and 33a provided on the rear surface of the second die 32b engage the guide grooves 13a and 13a in the first vertical plate 12a and engage the engagement grooves 7a and 7a in the clampers 6a and 6a.

The third die 32c is pushed by the arm 17e and moved (in the direction D in FIG. 6) so that the pins 33b and 33b provided on the rear surface of the third die 32c engage the guide grooves 13b and 13b in the first vertical support plate 12b, reaches a predetermined position (the position (A) shown in FIG. 1) in the first vertical support plate 12b and is held at the same position.

The first drive cylinder 10 and the working cylinder 17 are contracted (moved backward) to hold the first vertical support plates 12a and 12b in a waiting position at predetermined positions (the left in FIG. 1). After the latched position of the first die 32a by the stopper 30 has been released, the tilting cylinder 25 is contracted to incline the second vertical support plates 27a and 27b, thereby moving the first die 32a (toward the right in FIG. 1) until the first die 32a is brought into contact with the gate 31 and holding the first die 32a at a predetermined position (32a) between the second vertical support plates 27a and 27b. Then, the second drive cylinder 19 is contracted to hold the second vertical support plates 27a and 27b in waiting positions at predetermined positions (on the right in FIG. 1). Then, the clampers 6a and 6a are pulled (toward the die plate 1a) to insert the positioning pins 8a and 8a of the die plate 1a into the positioning recesses 35a and 35a in the second die 32b, thereby securing the second die 32b exactly to a predetermined portion of the die plate 1a (see FIG. 5(b)).

Then, the cylinder means 41 moves the die plate 1a backward in the direction B, and the push-pull rods 4 moves the die plate 1b forward in the direction B so that the die plate 1b, the first vertical support plate 12b and the second vertical support plate 27b are essentially in alignment.

Similarly as in the case of the die plate 1a, the die 32d is held by the second vertical support plates 27a and 27b and the die 32c is fastened to the die plate 1b. Then, after the tilting cylinder 25 is extended to return the tiltable framework 26 and the second vertical support plates 27a and 27b to horizontal positions, the latched position of the die 32d by the stopper 30 is released and the gate 31 is lifted up so that the dies 32a and 32d are taken out of a takeout side of the die carrying-out apparatus 3.

The repeat of the above-described procedure sequentially feeds a fresh die to the first vertical support plates 12a and 12b in the direction C shown in FIG. 6 and a die which has been replaced is fed from the second vertical support plates 27a and 27b in the direction C' shown in FIG. 6.

After the die exchange is completed, the cylinder means 41 and the push-pull rods 4 and 4 are contracted to move the die plates 1a and 1b backward to the molding chamber defining position (the upper place in FIG. 2), thereby providing the molding chamber 40 above the guideway 5 by means of the dies, an upper plate (not shown) etc.

It should be noted that modifications in the art may be done without departing the gist and concept of the present invention herein disclosed within the scope of the appended claims.

What is claimed is:

1. A die exchanger of a molding apparatus, comprising:
   a die plate having clamp means which has a groove, guides a die by means of pin means provided on the die and fastens the die at a predetermined position;
   a die carrying-in apparatus arranged on one side of said die plate; and
   a die carrying-out apparatus arranged on the other side of said die plate and opposite to said die carrying-in apparatus,
   said die carrying-in apparatus having at least one guide groove which engages the pin means of the die and guides a plurality of corresponding dies, said die carrying-in apparatus having a first support plate movable forward and backward to said die plate so that the guide groove is connectable to the groove in the clamp means,
   said die carrying-out apparatus having a second support plate movable forward and backward to said die plate so that the second support plate can receives the die engaging the clamp, the second support plate movably supporting the die,
   said die carrying-in apparatus having one-way feed means for feeding each of the corresponding dies which is supported by means of the guide groove on the first support plate to said die plate.

2. A die exchanger of a molding apparatus as defined in claim 1, wherein a die plate side end of the guide groove in said die plate carrying-in apparatus includes a recess engaging one end of the clamp means having the groove of the die plate to form a continuous groove.

3. A die exchanger of a molding apparatus as defined in claim 1, wherein the first support plate of said die carrying-in apparatus includes a pair of opposite support plates each of which includes the guide groove guiding separate dies.

4. A die exchanger of a molding apparatus as defined in claim 2, wherein the first support plate of said die carrying-in apparatus includes a pair of opposite support plates each of which includes the guide groove guiding separate dies.

5. A die exchanger of a molding apparatus as defined in any one of claims 1-4, wherein said die carrying-out apparatus has tilting means for slidably discharging the die, and one end opposite a die plate side of the second support plate has a die takeout gate.

6. A die exchanger of a molding apparatus as defined in any one of claims 1-4, wherein one-way feed means of said die carrying-in apparatus is movable forward and backward to the first support plate along the longitudinal axis of the guide groove in the first support plate and has one-way engagement means engageable with the die only in a feeding direction of the die.

7. A die exchanger of a molding apparatus as defined in claim 5, wherein one-way feed means of said die carrying-in apparatus is movable forward and backward to the first support plate along the longitudinal axis of the guide groove in the first support plate and has one-way engagement means engageable with the die only in a feeding direction of the die.

8. A die exchanger of a molding apparatus as defined in claim 6, wherein said one-way feed means has a base portion relatively slidably disposed on the first support plate along the sliding direction of the first support plate, and at least one arm pivotably installed on the base portion and engageable with a die supported on the first support plate only when the base portion is relatively slid on the first support plate in the feeding direction of the die plate.

9. A die exchanger of a molding apparatus as defined in claim 7, wherein said one-way feed means has a base portion relatively slidably disposed on the first support plate along the sliding direction of the first support plate, and at least one arm pivotably installed on the base portion and engageable with a die supported on the first support plate only when the base portion is relatively slid on the first support plate in the feeding direction of the die plate.

10. A die exchanger of a molding apparatus, comprising;
   a pair of die plates slidably disposed on a guide way, the die plates being positionable facing each other with facing surfaces extending transversely to the guideway,
   a die carrying-in apparatus arranged on one side of said guide way, and
   a die carrying-out apparatus arranged on the other side of the guide way at a position opposing the die carrying-in apparatus,
   each of said die plates having clamp means on the facing surface for guiding and clamping at a predetermined position a die fed from the die carrying-in apparatus,
   said carrying-in apparatus having a first support plate slidably disposed in a direction transverse to said guide way and guiding a die toward the die plates; and having one-way feed means for feeding a die to the die plate along a longitudinal surface of the first support plate,
   said one-way feed means having a base portion slidably disposed relative to the first support plate along the sliding direction of the first support plate and at least one arm pivotably installed on the base portion and engageable with a die supported on the first support plate only in one way movement toward the guide way,
   said carrying-out apparatus having a second support plate slidably disposed transverse to said guide way for receiving a die from the die plate and guiding away from the die plate, and tilting means for tilting down the remote end of the second support plate so as to slidably discharge a die.

11. A die exchanger of a molding apparatus as defined in claim 10, wherein said clamp means includes a groove member extending along the sliding direction of a die, the groove member being engageable with a portion of the die and slidably disposed on the surface of the die plate between a protruded position defining a slidable groove position and a retracted position defining a clamping position.

12. A die exchanger of a molding apparatus as defined in claim 10, wherein each of said pair of die plates has a pin on the surface opposing to each other for positioning the die by engaging a recess of the die.

13. A die exchanger of a molding apparatus as defined in claim 10, wherein said first support plate has an engaging portion at an end directed to the die plate, the engaging portion being engageable with clamp means of the die plate when the first support plate is slid to the die plate.

14. A die exchanger of a molding apparatus as defined in any one of claims 10, 11 and 13, wherein said first support plate has a guide groove on its longitudinal surface for guiding a die toward the die plate during engaging a portion of die, the guide groove being connected with the groove member of clump means to form a continuous groove when the engaging portion of the first support plate abuts to the die plate.

15. A die exchanger of a molding apparatus as defined in claim 10, wherein said first support plate is comprised of a pair of plates opposing each other to provide a feeding path between both the plates, and each plate supporting and guiding a die.

16. A die exchanger of a molding apparatus as defined in claim 10, wherein said carrying-out apparatus has a die takeout gate at one end opposite to the die plate side of the second support plate.

* * * * *